May 28, 1935. W. N. BARRINGTON 2,002,877
WELDING EQUIPMENT AND METHOD OF WELDING
Filed Sept. 20, 1932
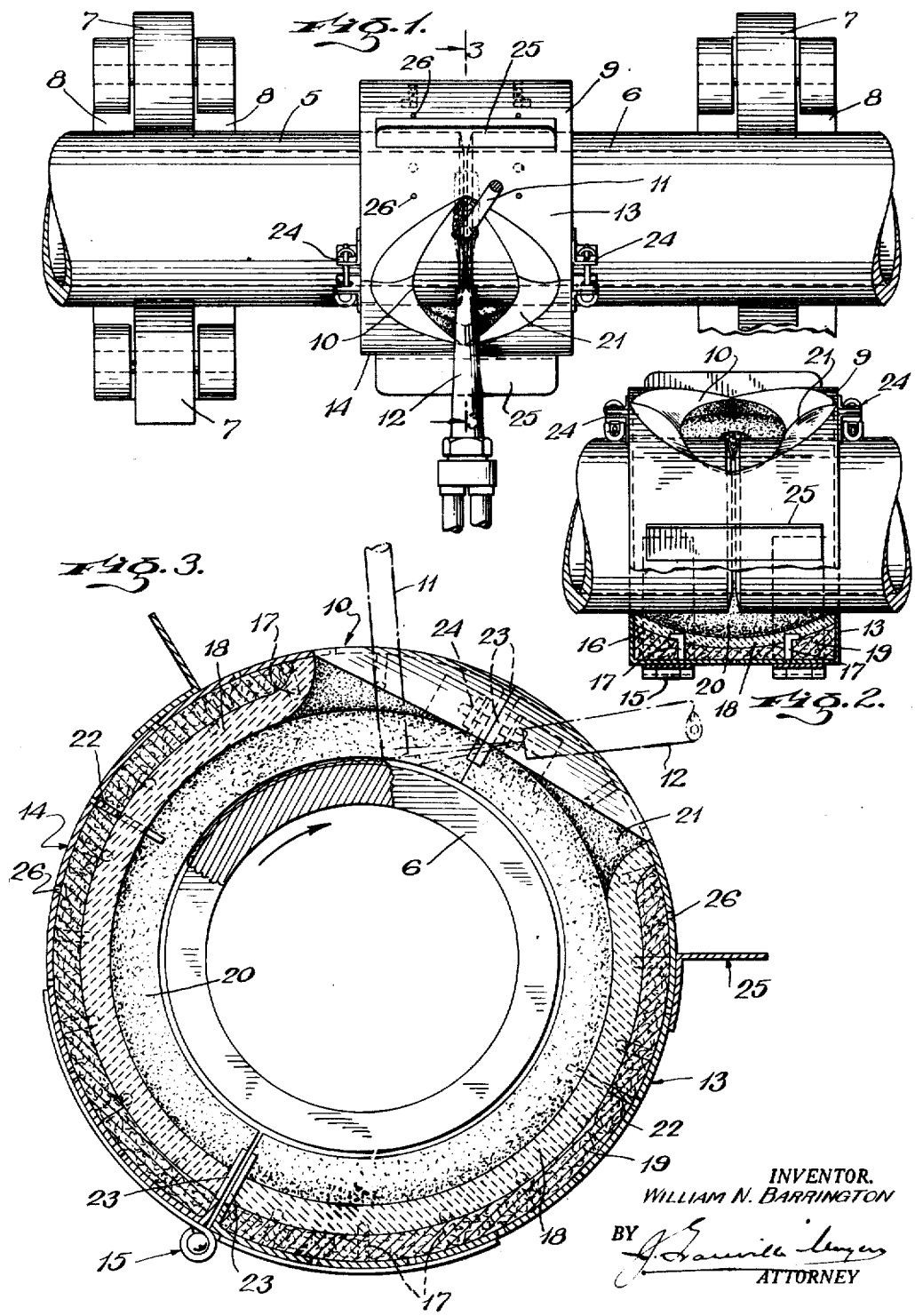
INVENTOR.
WILLIAM N. BARRINGTON
BY
ATTORNEY Patented May 28, 1935

2,002,877

UNITED STATES PATENT OFFICE 2,002,877

WELDING EQUIPMENT AND METHOD OF WELDING

William N. Barrington, Birmingham, Ala., assignor to The American Cast Iron Pipe Company, Birmingham, Ala., a corporation of Georgia Application September 20, 1932, Serial No. 634,084

10 Claims. (Cl. 113—111)

My invention relates to a method of and apparatus for welding, and is hereinafter described and illustrated in connection with butt-welding of pipes.

Prior to my invention it was not possible to obtain, by the method and apparatus generally used, a welded joint between sections of cast iron pipes which would test out equal in strength to the pipes themselves. The failure was not generally in the weld, but rather adjacent the weld where the metal was weakened as a result of concentrated heating and relatively quick cooling, which sets up stress in the metal. Under such conditions there is a definite tendency to brittleness.

My invention obviates the foregoing defects and affords welded joint and pipe sections of equal strength to that of the original unwelded sections, by not only excluding cooling air currents from contact with the ends during the welding operation, but also the adjacent portions of the sections, while simultaneously pre-heating the parts to be welded and slowing down the cooling of parts already welded. This may be accomplished by enclosing a substantial portion of the alined ends of pipe sections in such a manner and by such apparatus as to constrain the welding torch flame and combustion gases to substantially encircle the pipe ends while they are being welded.

It has been established by actual tests that sections of cast iron pipes welded together in accordance with my invention possess uniform strength throughout, that is, the welded joint and adjacent portions of the pipe are as strong as the pipes before welded.

All of the objects, advantages and details of the construction, operation and use of my invention will be better understood after reading the following description of the method and of the apparatus shown in the accompanying drawing, wherein:—

Fig. 1 is a top plan view of parts of alined pipe sections, supports therefor, with their ends surrounded by a device embodying my invention and showing the welding torch in operative position;

Fig. 2 is a front view of my apparatus and the pipes shown in Fig. 1, with parts broken away; and Fig. 3 is a view taken on the line 3—3 of Fig. 1.

Referring to the drawing, the numeral 5 designates one section of pipe and 6 another section, each supported on rollers 7, journaled on supports 8. The rollers hold the sections in alined relation with the ends of the sections relatively positioned for welding. I mount a collar-like member, designated generally by the numeral 9 in Fig. 1, around the said ends and adjacent portions of the sections to substantially enclose said ends and portions during the welding operation, and the member 9 has a mouth or opening 10 thru which the welding rod 11 may be applied to the ends of the sections in advance of the flame from the torch 12.

The details of construction of member 9 are shown best in Figs. 2 and 3, wherein the numerals 13 and 14 designate arcuate sections of the outer casing hingedly secured together by the strap hinge 15 which may be welded to the casing. As shown in Fig. 2, the casing members 13 and 14 have side walls 16 so that the casing is channeled in cross-section. Anchors 17 are provided on the interior of the casing members at suitable intervals so that their outer hooked ends will embed in the refractory lining 18 applied over a layer of insulating material 19. The face of the refractory lining 18 is concave or curved between the sides 16 of the casing to provide a channel 20 between the collar-like member and pipe sections.

In actual use I have found that a silocel lining is very satisfactory, it being applied over the insulation and anchors as a mortar, and troweled to provide the concave face and rounded surfaces 21 at the mouth 10. I also preferably make the refractory lining in sections, which may be done conveniently by welding dividing plates 22 to the interior of the casing at spaced intervals. This is for the purpose of minimizing the total expansion of the material in any given part, that is, by dividing the refractory lining into sections I reduce the expansion relative to what it would otherwise be and avoid the loosening of the lining because of great expansion. Plates 23, similar to plates 22, are provided at the ends of each section of the collar-like member to form the ends of each section and to confine the insulating material and refractory lining. This is necessary since the member 9 must be opened on hinge 15 to span the pipe sections. When the member 9 has been placed around the pipe section it is held closed by the fastening elements 24 which may be of any character or type.

A handle 25 is welded or secured to each section 13 and 14 to facilitate expansion and removal of the hood 9, and the outer casing is preferably provided with apertures 26 for escapement of gases generated while drying the refractory lining and for any gases which might be generated during use of the equipment, which use is as follows:

With the pipe sections positioned as shown in Fig. 1, and the hood 9 applied thereto, the ends and adjacent portions of the pipes are substantially enclosed except at the mouth 10, where the welding rod and torch are applied as shown. Obviously, the channel 20 extends circumferentially around the pipes between the ends of mouth 10, so that when the torch is operated to project the flame thru said mouth and against the pipes, the flame and gases of combustion will circulate around the pipe thru the channel, and with the pipes rotating in the direction of the arrow (Fig. 3), the welding is accomplished on successive portions of the pipe passing the mouth with the welded and approaching unwelded portions protected from strong currents of air which would tend to unequally cool the portions, with the approaching portions pre-heated in the channel, and with the welded portions gradually cooling as they pass from the flame into the region of the combustion gases. The arrangement described thus performs several important functions, and might be termed a "self-contained annealing oven" as well as a shield.

It will be understood that the flame is expended after partially passing around the channel and that from that point on the hot gases fill the channel, which provides for the gradual cooling.

What is claimed is:

1. A device for use in butt-welding comprising, a channeled collar-like member to surround the ends and adjacent portions of parts to be welded to provide an arcuate chamber for said parts and member, said member having an opening for application of a flame to the said ends and portions, said channel and opening communicating, whereby the flame and combustion gases will circulate thru the chamber.

2. A device for use in butt-welding comprising, a collar-like member to surround the ends and adjacent portions of the parts to be welded, a lining of refractory material in said member confronting the said ends and portions, the face of said refractory lining providing an annular channel around the parts and said member having an opening communicating with said channel for projection of a welding flame against said parts and into said channel.

3. A device for use in butt-welding pipes and the like comprising, a sectional member, means for connecting the sections to form a hood around the ends and adjacent portions of the pipes to be welded, each of said sections being provided with a substantially arcuate groove on its inner face to provide an annular channel around said ends and adjacent portions, and one of said sections having a peripheral opening communicating with said channel for projection of a welding flame against said pipe sections and into said channel whereby the flame and combustion gases will circulate around the channel and pipes.

4. A device for use in butt-welding comprising, a collar-like member to surround the ends and adjacent portions of the parts to be welded, a sectional refractory lining in said member, said lining having a grooved face to confront said portions and to provide a channel therearound, said member having an opening for projection of a welding flame against said portions and into said channel.

5. A device for use in butt-welding comprising, a collar-like member formed of two arcuate channel-shaped members, a section of refractory material within each of said channel-shaped casing members, each of said sections being also arcuate and having a grooved face to confront the pipe sections, means connecting the casing members for relative movement, and means for releasably securing the casing members around the pipe sections.

6. The method of joining sections of pipe by welding, which comprises alining the sections in end to end relation, circumferentially enclosing a substantial part of the ends and adjacent portions of the sections in an annular chamber having a peripheral opening, rotating said pipe sections, and while rotating them progressively applying welding material through said opening and projecting a flame against pipe sections in the region of the welding material within the chamber to unite the sections and to circulate the products of combustion around said sections and chamber.

7. In apparatus for butt-welding sections of pipes and the like, a collar-like member to surround the ends and adjacent portions of the pipes or the like to be welded, said member when applied around said pipes or the like providing in conjunction therewith an annular chamber substantially closed at each end by contact between the ends of the collar-like member and portions of each pipe, said member being provided with a peripheral opening for projection of a flame against the ends of the pipes or the like to be welded whereby the flame and combustion gases will circulate through said chamber, and means for rotating said pipes or the like within said collar-like member to progressively move the ends of the parts of the pipes or the like to be welded past said opening.

8. The method of joining sections of pipe by welding, which comprises alining the sections in end to end relation, circumferentially enclosing a substantial part of said ends and portions of the sections adjacent thereto within a chamber having a peripheral opening, rotating the sections, and while rotating them progressively applying welding material through said peripheral opening and projecting a flame thereagainst and against said ends to unite the sections while simultaneously heating parts of the ends and portions to be welded in said chamber, and then subjecting the welded parts to a slow cooling in said chamber.

9. A device for use in butt-welding comprising, a hood having alined openings one in each of its sides through which the parts to be butt-welded are positioned, said hood providing in conjunction with the parts when assembled therein a substantially closed annular chamber around the parts to be welded for the exclusion of air currents and having a peripheral opening for projection of a welding flame against the parts and around said chamber, and said hood permitting rotation of the parts in said chamber past said opening.

10. The method of butt-welding which comprises, alining the parts to be welded in end to end relation circumferentially, and enclosing substantial portions of the ends of said parts within a chamber to exclude air currents from contact with said enclosed ends and portions, and while so enclosed projecting a flame through a peripheral opening in the chamber against said ends and into the chamber circumferentially around said ends, rotating the parts within said chamber while projecting the flame therein, and progressively feeding welding material to said ends through said opening in proximity to the flame as the parts rotate.

WILLIAM N. BARRINGTON.